Feb. 20, 1940.  F. MOORE  2,190,912
MEASURING AND RECORDING INSTRUMENT
Filed March 6, 1935  8 Sheets-Sheet 3
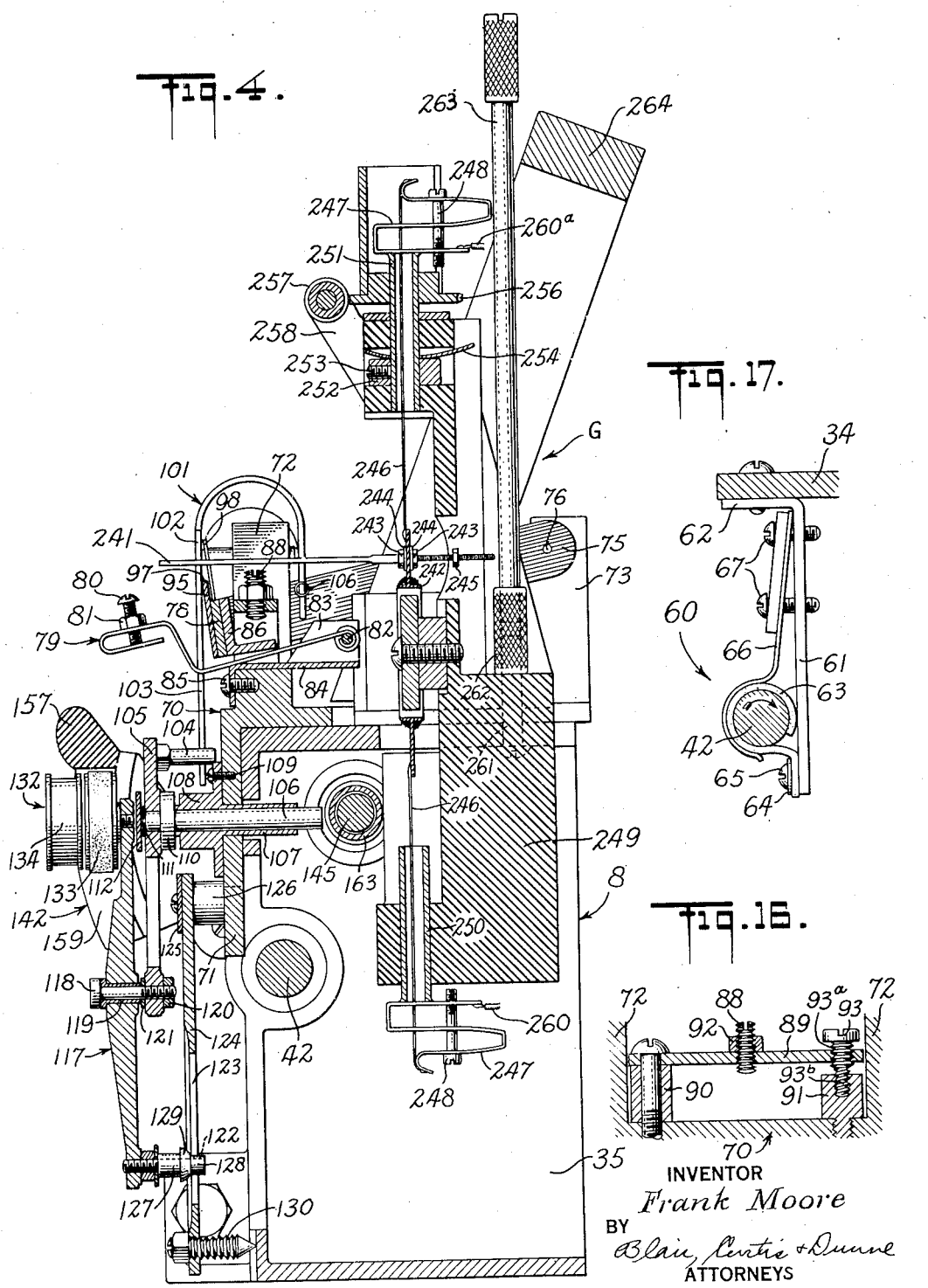
INVENTOR
*Frank Moore*
BY
*Blair, Curtis & Dunne*
ATTORNEYS

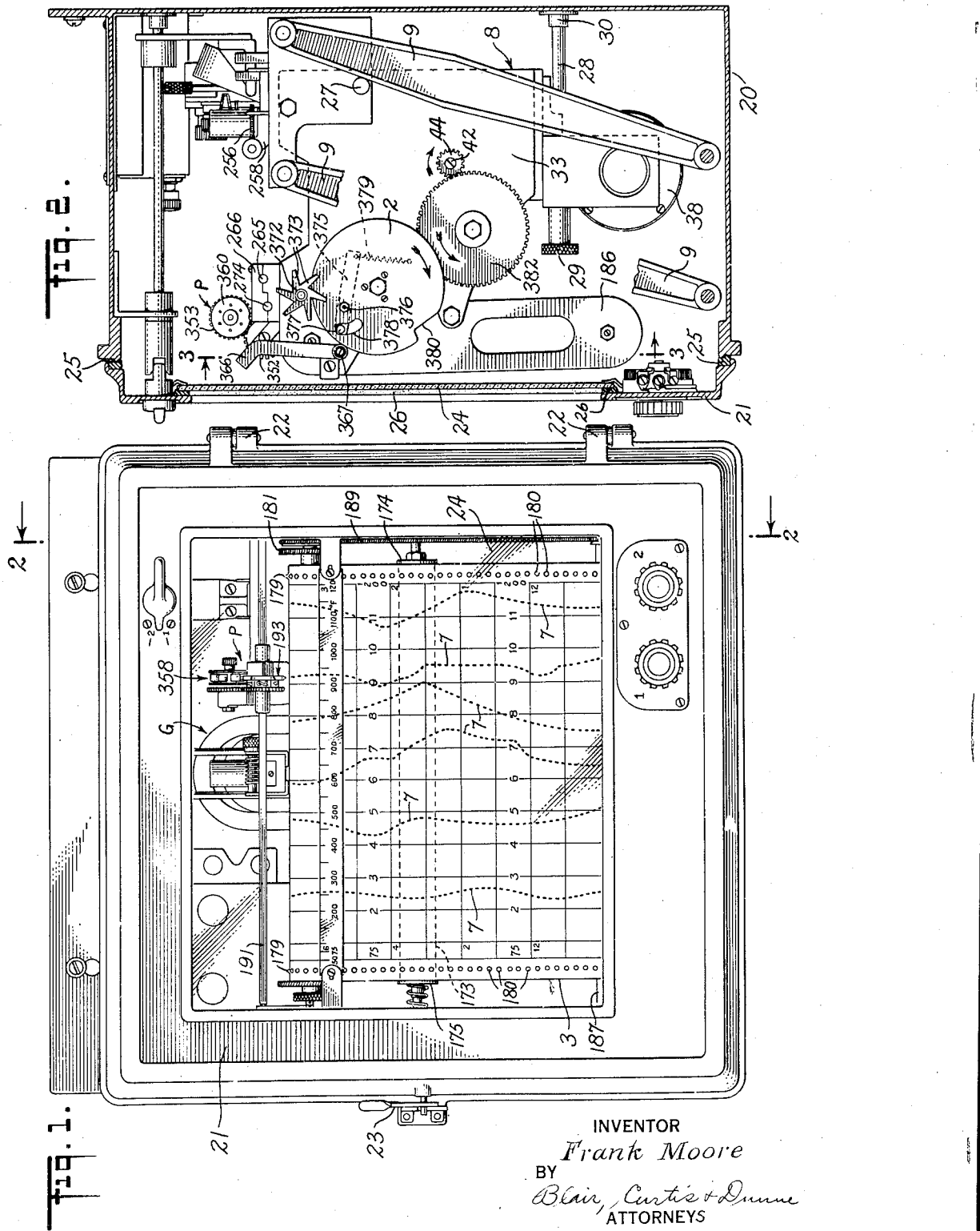

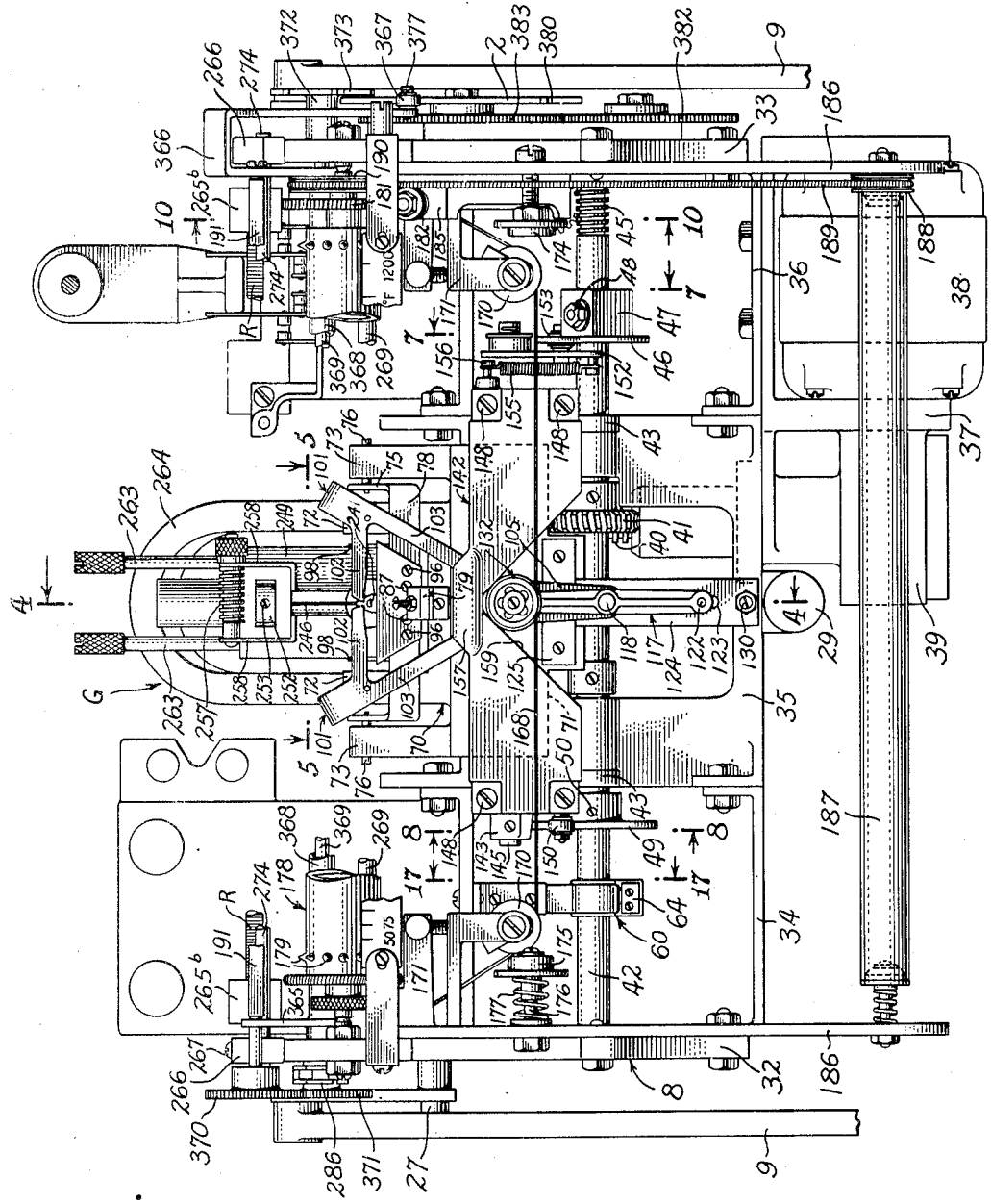

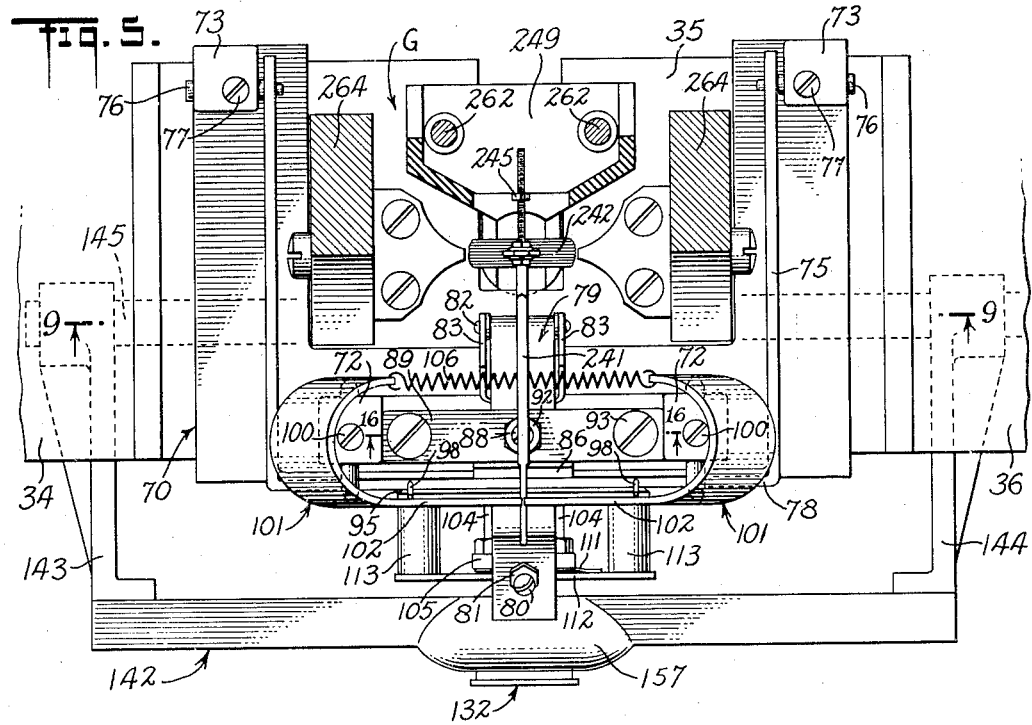
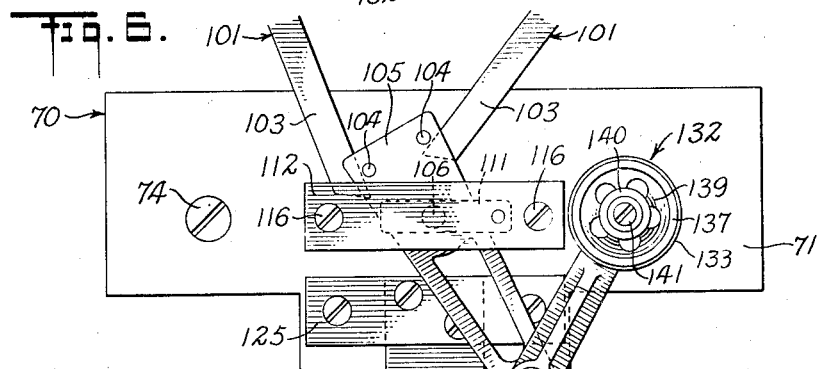
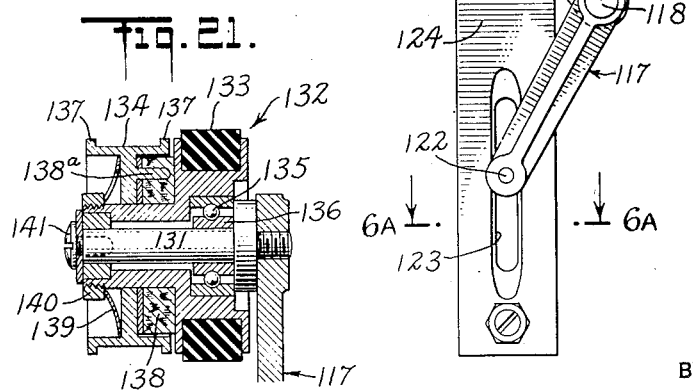
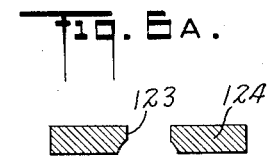

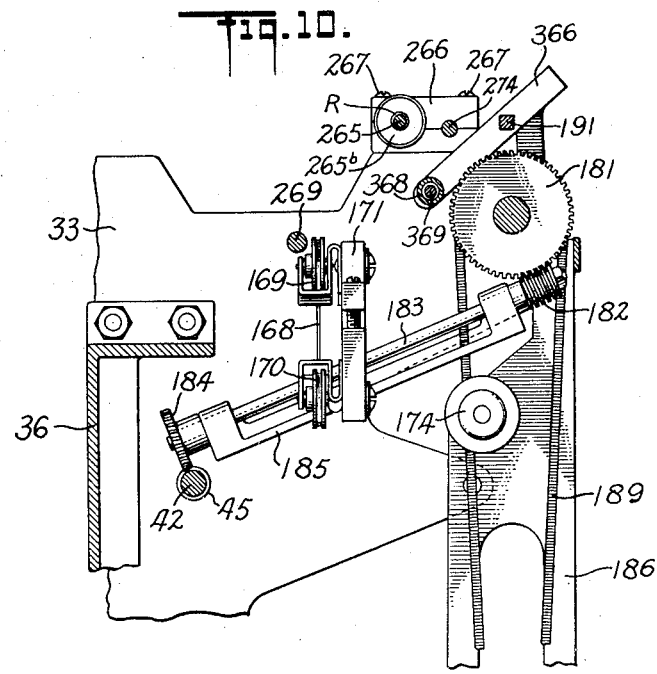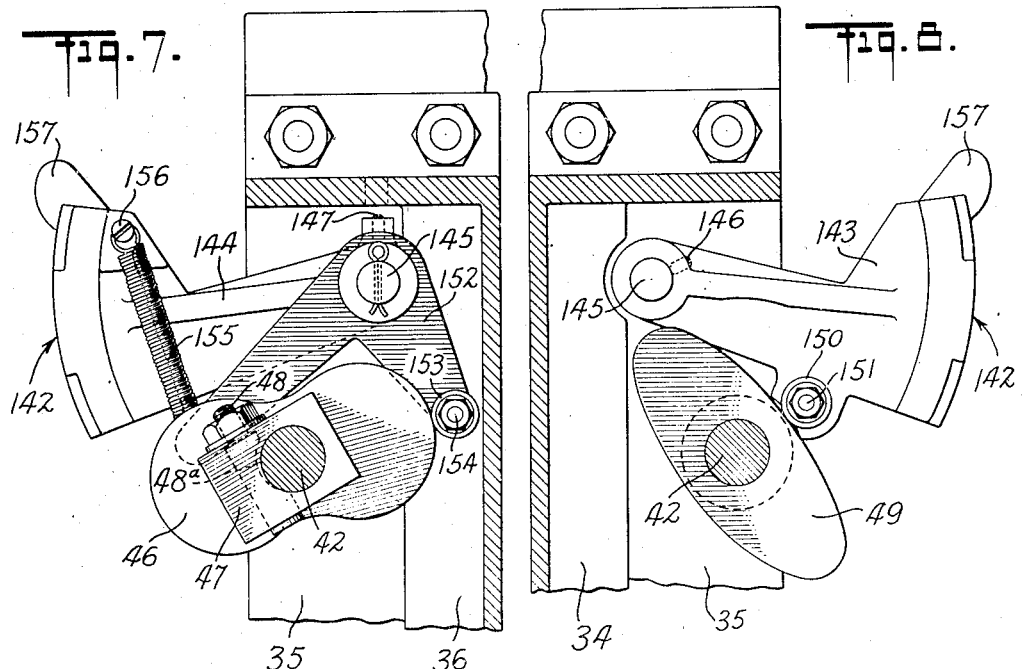

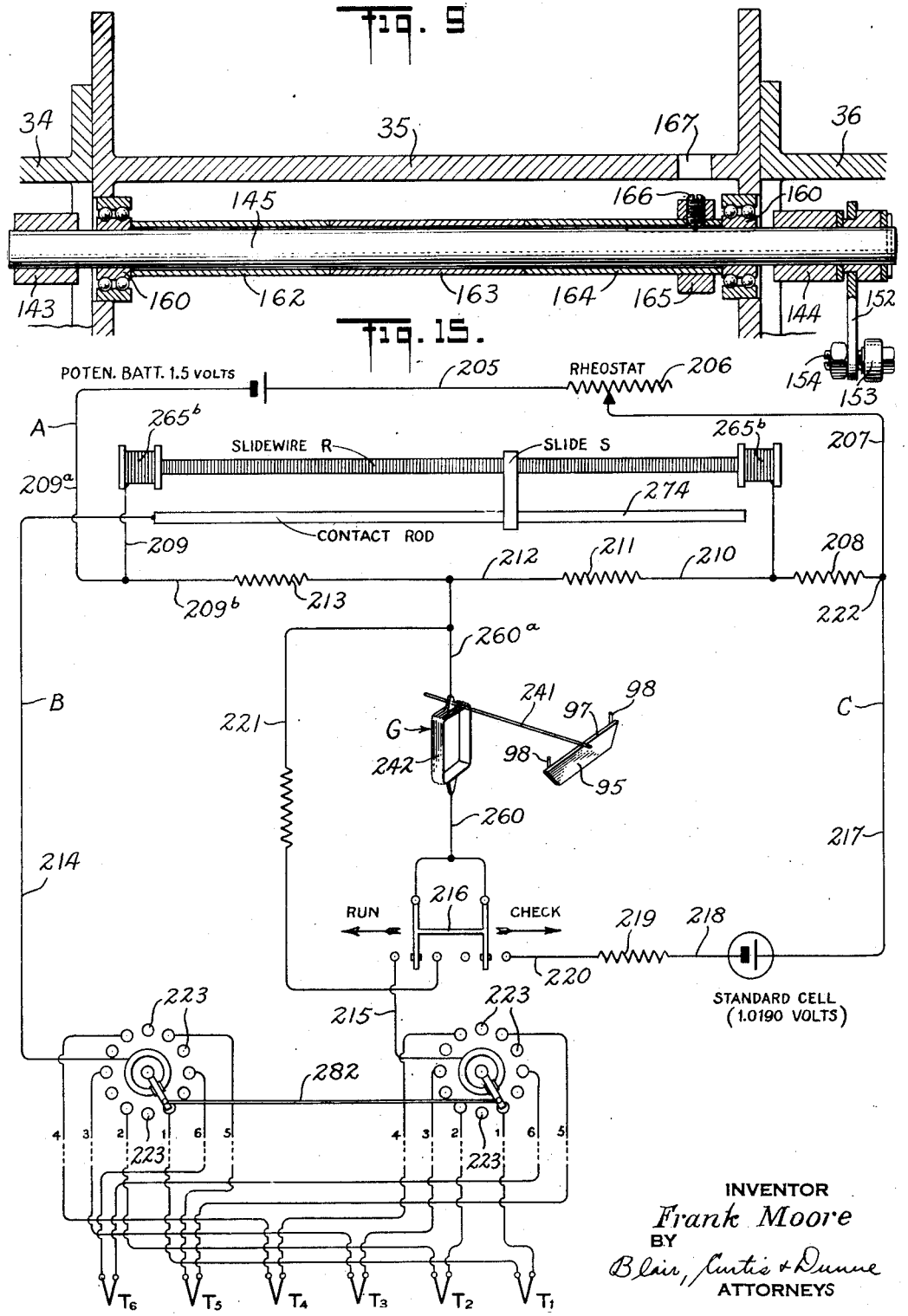

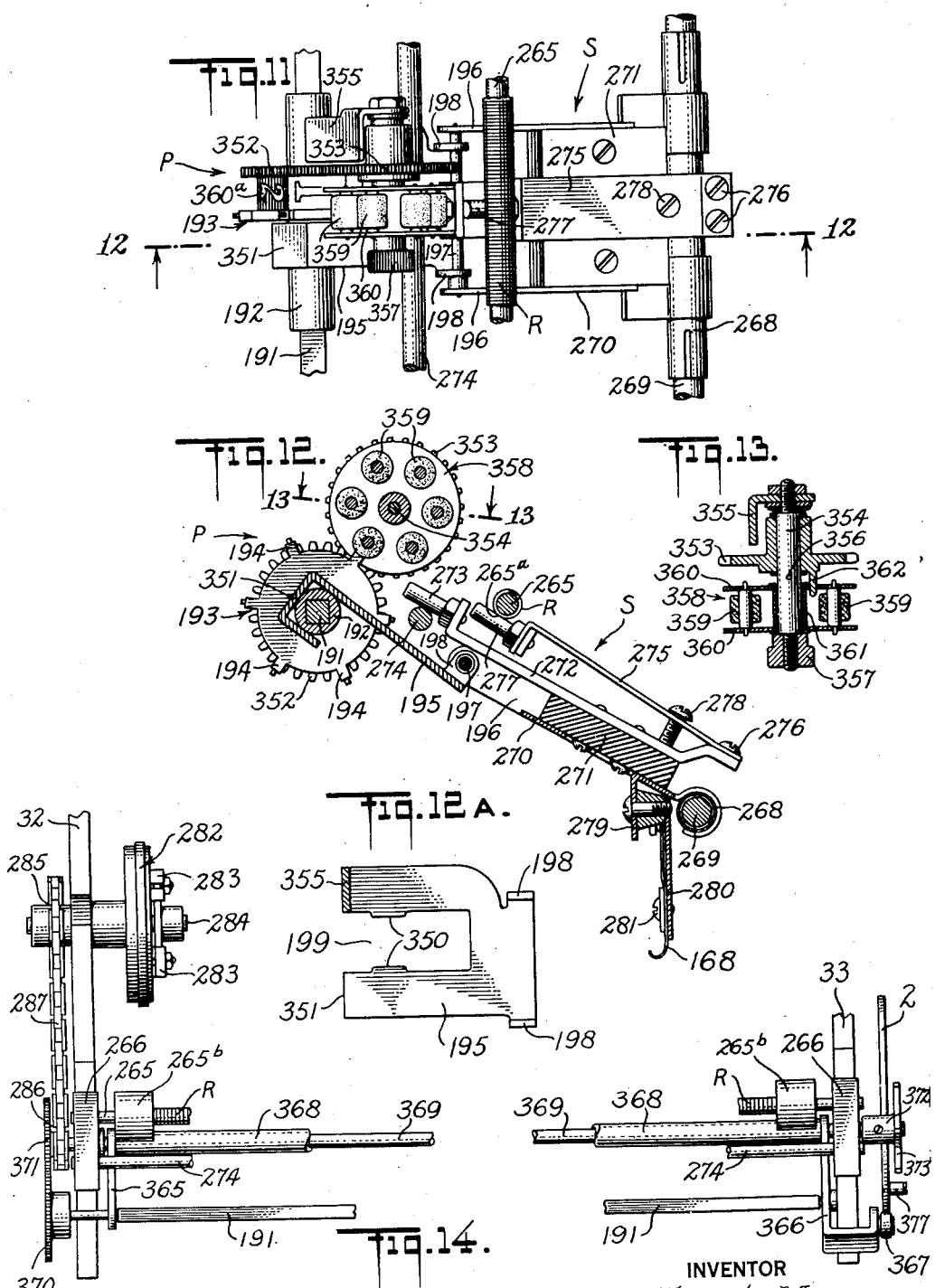

Feb. 20, 1940.  F. MOORE  2,190,912
MEASURING AND RECORDING INSTRUMENT
Filed March 6, 1935  8 Sheets-Sheet 8
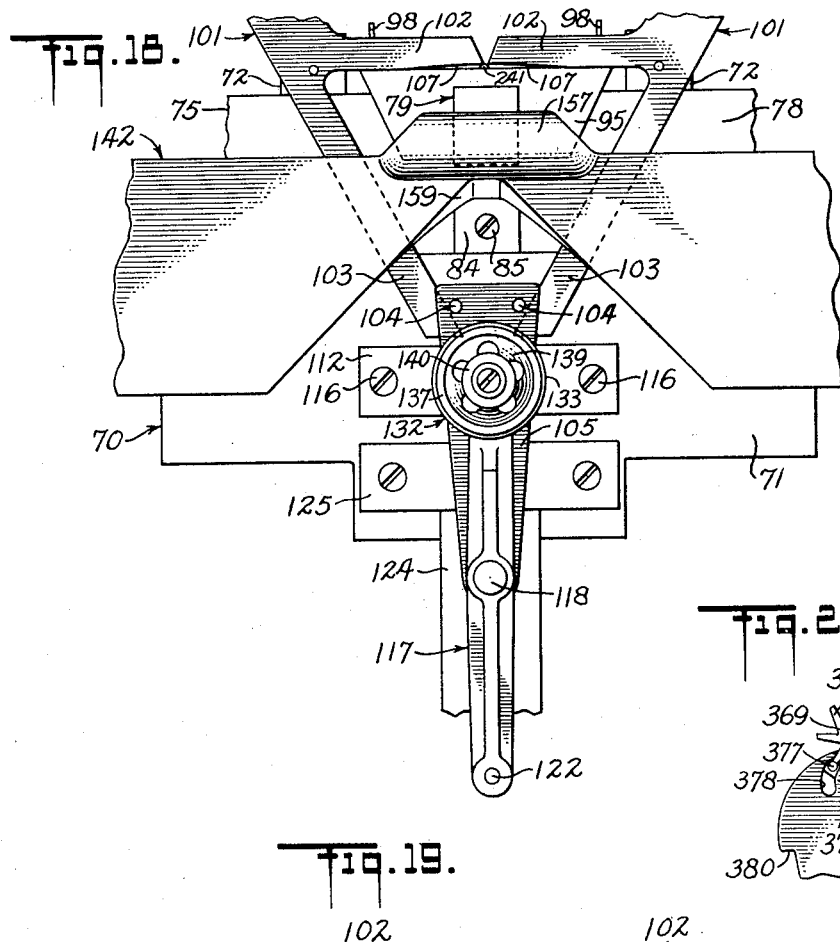
INVENTOR
Frank Moore
BY
Blair, Curtis + Dunne
ATTORNEYS Patented Feb. 20, 1940

2,190,912

UNITED STATES PATENT OFFICE 2,190,912

MEASURING AND RECORDING INSTRUMENT

Frank Moore, Foxboro, Mass., assignor to The Foxboro Company, Foxboro, Mass., a corporation of Massachusetts Application March 6, 1935, Serial No. 9,655

10 Claims. (Cl. 74—1)

This invention pertains to measuring and recording instruments and more particularly to such instruments wherein an electrical circuit sensitive to a condition being measured is balanced by a corrective influence, the amount of corrective influence necessary to balance the circuit being an indication of the value of the condition.

The invention further contemplates an instrument capable of successively measuring the values of a plurality of conditions and successively recording the values of each on a chart which then shows the continuous record of the value of each condition over a period of time.

A specific example of such an instrument is shown in the embodiment described in this application and is what might be termed a multiple record recording pyrometer, the term pyrometer being intended to designate an instrument capable of recording high, as well as the medium temperatures.

Among the several objects of the invention may be noted the provision of an improved balancing mechanism for such an electrical instrument in which the balance is obtained relatively rapidly without rapidly moving parts so that a single instrument may successively measure and record the values of a plurality of conditions.

Another object is to provide recording or printing mechanism for such a multiple recorder wherein each record may be printed in a characteristic color.

Another object is to provide an instrument wherein mechanical and electrical lags or lost motion are reduced to a minimum or compensated.

Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which are shown one or more of the various possible embodiments of this invention.

Figure 1 (sheet 1) is a front elevation of a multiple record recording pyrometer embodying the invention and showing through a glass window of a door of a casing enclosing the instrument a chart record such as the instrument may make;

Figure 2 (sheet 1) is a vertical section of the right side of the instrument (with reference to Figure 1) and taken on line 2—2 of Figure 1, certain parts being broken away;

Figure 3 (sheet 2) is an enlarged front elevation of the instrument removed from its casing, certain parts being broken away to show other parts;

Figure 4 (sheet 3) is an enlarged vertical section looking from the right hand side (with reference to Figure 1) and taken on line 4—4 of Figure 3;

Figure 5 (sheet 4) is an enlarged top plan view of a galvanometer and other parts located near the central portion of the machine (with reference to Figure 3);

Figure 6 (sheet 4) is an enlarged front elevation (with reference to Figure 1) of a straight line motion mechanism forming a part of the balancing mechanism;

Figure 6—A (sheet 4) is a horizontal section taken on line 6A—6A of Figure 6;

Figure 7 (sheet 5) is a vertical section taken on line 7—7 of Figure 3 (looking from the right) and showing in elevation a cam for influencing the operation of a rocker cam;

Figure 8 (sheet 5) is a view similar to Figure 7 (but looking from the left hand side of Figure 3) and showing another cam influencing the operation of the same rocker cam;

Figure 9 (sheet 7) is a vertical axial section of the shaft on which the rocker cam is mounted and taken on line 9—9 of Figure 5;

Figure 10 (sheet 5) is a vertical section taken on the right hand side of Figure 3 and showing mechanism for driving a chart;

Figure 11 (sheet 6) is a top plan view of printing mechanism shown in the upper central portion of Figure 1;

Figure 12 shows a vertical section on line 12—12 of Figure 11;

Figure 12—A (sheet 6) is a plan view of a frame shown in Figure 12;

Figure 13 is an axial section taken on line 13—13 of Figure 12;

Figure 14 (sheet 6) shows in a top plan view mechanism for operating the printing mechanism and also for operating a switch;

Figure 15 (sheet 7) is a diagrammatic view showing an electrical circuit such as may be used with an instrument embodying the invention;

Figure 16 (sheet 3) is a section taken on line 16—16 of Figure 5 and showing mechanism for adjusting a stop;

Figure 17 (sheet 3) is an enlarged side elevation of a brake mechanism;

Figure 18 (sheet 8) is a front elevation of the balancing mechanism in a raised position, showing a galvanometer needle in its neutral position;

Figure 19 (sheet 8) is a detailed elevation of a galvanometer needle and detecting arms showing the needle slightly off its neutral position;

Figure 20 (sheet 8) is a view similar to Figure 19 but showing the needle further deflected from its neutral position;

Figure 21 (sheet 4) is an axial section through a sheave or pulley shown in Figure 6;

Figure 22 (sheet 8) is a side elevation of a cam for driving the printing mechanism.

Corresponding reference characters refer to corresponding parts throughout the several views of the drawings.

*General discussion of instrument chosen to illustrate inventions*

The instrument chosen to illustrate the present invention is particularly adapted for measuring and recording a plurality of temperatures on a chart shown through the window in Figure 1. Broadly, the instrument includes a potentiometer or bridge circuit, such as shown in Figure 15 including a thermo-couple circuit B, the hot junction of which is subjected to the temperature of a condition being measured. A variable resistance R is adjustable to supply the corrective influence necessary to balance the potentiometer circuit to the thermo-couple. A galvanometer G indicates the state of balance or unbalance by means of a needle which swings to the right or left of a zero or neutral position. A balancing mechanism run by a servo-motor and commanded by the galvanometer adjusts a slide S along the resistance to balance the circuit.

The resistance R and the slide S are preferably so proportioned and arranged that the position of slide S indicates the amount of corrective influence necessary to balance the circuit. This value may be directly translated into temperature readings and so the slide S serves as an indication of the value of the condition being measured. Advantage is taken of this fact by mounting a printing mechanism indicated at P (Figure 1, upper right hand corner) with the slide S, the printing mechanism being operated in conjunction with the balancing mechanism to record periodically on a chart the position of the slide S (and hence the value of the condition being measured).

As shown in the diagram of Figure 15 a switch (as shown in the lower left hand corner) may connect successively a plurality of thermo-couples T with the potentiometer circuit so that the single instrument may measure and record a number of temperatures obtaining at different places. Inasmuch as a period of time is required to balance any particular thermo-couple after it has been connected with the potentiometer circuit, it is desirable so to time the balancing mechanism and the printing mechanism as to allow ample time for the balancing mechanism to complete its balancing operation before the printing mechanism prints a record, thereby insuring that the printing mechanism will not print an inaccurate temperature measurement. The details as to how this is accomplished will be pointed out hereinafter.

With reference to the general mechanical aspect of the instrument, in the present embodiment (Figure 1, upper right hand portion) printing mechanism generally indicated as P is operated by a cam 2 and associated mechanism shown in Figure 2 to print periodically on a chart 3 the successive temperature measurements as determined by the electrical circuit. The printing mechanism is positioned with respect to the chart by balancing mechanism generally shown in the central portion of Figure 3, the balancing mechanism being under the command of the galvanometer needle 241. The characteristics of the balancing mechanism and the galvanometer are preferably so proportioned that when the galvanometer needle swings to either side of its zero position (but not going to its extreme positions) the balancing mechanism moves the slide S and printing mechanism to a position which makes a correction which should be just sufficient to balance the potentiometer circuit to cause the galvanometer needle to move to its zero position. For many reasons, such operation is rarely obtained and several steps are usually required to balance the circuit. As a matter of precaution nine operations or balancing steps are actually allowed before any measurement is recorded, i. e., after every nine balancing operations the cam 2 completes a rotation and causes the printing mechanism to print the reading on the chart in a color characteristic of the condition measured. Such records are shown at 7 on the chart. The chart 3 may be continuously driven at a speed which is suited to the number of dots or records made per unit of time for recording the different conditions.

In the present invention the time of balancing the potentiometer circuit necessary to obtain an accurate measurement is so short that a number of different thermo-couples sensitive to different conditions may be led to the one instrument and successively cut into the potentiometer circuit and balanced to give an accurate reading and the result recorded on a single chart in a cycle which is of a sufficiently short period of time to make a record sufficiently continuous for many purposes. For example, it has been found with an instrument, such as to be described, that each of a number of different temperatures may be measured and recorded every forty-five seconds even when the temperatures are at the opposite limits of the chart. Hence, if six different temperature conditions are being recorded, a reading on any one may be recorded every 4.5 minutes.

*Casing and frame work*

The mechanism for the most part is encased in a case 20 formed from some strong material such as pressed steel and having side and back walls and a door 21 mounted on the case by suitable hinges 22, the door being held in a closed position by a lock 23. The door is provided with a window 24 through which the chart and certain of the instrumentalities may be observed. Referring to Figure 2 (at the left hand side) a rubber gasket 25 between the door and case and a similar gasket 26 between the window and door are provided to keep the case more dustproof as is advisable when the instruments are mounted in industrial plants.

Within the casing is the carriage generally indicated at 8 on which most of the mechanical and electrical parts of the instrument are mounted. The carriage is preferably mounted on supporting bars 9 pivotally secured to the carriage and to the side walls of the case near the base thereof by suitable bolts or studs so that the whole carriage may be pulled forward from the case, the bars 9 forming a shifting parallelogram support. A fixed stud 27 extending on either side of the carriage provides stops limiting the movement of the carriage from the case and into the case. With this arrangement the mechanism mounted on the carriage may be readily withdrawn from the case for inspection or adjustment and then easily returned. A screw clamp 28 extending through the lower central part of the carriage is operable by a knob 29 to clamp the carriage to the back of the case by threading the screw into a threaded well 30 in the back wall of the case to hold the carriage in its receded position.

Referring to Figures 2 and 3, the carriage or frame is shown as comprising the side castings 32 and 33 attached to the bars 9 and connected by box-like sections 34, 35 and 36, the sections being connected to each other by suitable bolts or the like. By thus constructing the carriage in sections the assembly of the parts is facilitated and made more flexible.

Main drive for moving parts

All the moving parts of the mechanism are driven from one main cam shaft driven by a motor 38 mounted on a piece of framework 37 secured to the underside of the carriage. The motor 38, which is preferably of a constant speed, drives through various reduction gears and shafts (not shown) a worm 40 extending vertically from casing 39 and barely visible in the central portion of Figure 3. The worm 40 preferably drives a bevelled gear 41 keyed to a main cam shaft 42. This shaft is preferably mounted in suitable bearings, not shown but located within casings 43 mounted in the middle section 35 of the carriage. The bearings are preferably of the type designed to secure shaft 42 against any lateral movement. The right hand end of the shaft, as viewed in Figure 3, extends through a hole in the casing and to it (Figure 2) is suitably keyed a pinion gear 44 which, as will be described, drives the printing mechanism. As viewed in Figure 3, the right hand end of the shaft 42 (just before entering the side frame) is provided with a worm thread 45 preferably cut into the shaft, the worm thus formed providing the drive for the chart as will be described. Also on the right side of the shaft, between the worm and the shaft mounting, is a cam 46 (see also Figure 7) suitably mounted on a block 47 adjustably secured to the shaft by tightening a threaded bolt 48. With this construction the cam may be adjusted along the shaft or around it as desired. The bolt 48 extends into the block 47 and is cut out as at 48a to receive the shaft 42. By tightening the nut on the bolt 48 the bolt is forced against the shaft clamping the shaft and block together.

On the other side of its mounting shaft 42 is provided with a cam 49 (see Figure 8) suitably secured to the shaft by a set screw 50, which sets into a flattened portion of the shaft.

To maintain a constant load on main shaft 42 to prevent the shaft from over-riding the motor under the influence of various spring pressed parts on the cams of the shaft, a brake generally indicated at 60 (lower left hand corner of Figure 3 and Figure 17) is mounted on the underside of top shelf of section 34 by any suitable means such as the screw shown. The brake comprises a rigid base 61 having an angle 62 formed at the top thereof into which the mounting screw threads. On the lower end of the base is attached a strip of leather 63 by means of a rectangular clamping strip 64 clamping between it and base 61 the end of the leather strip and held in clamping position by screws 65. As viewed in Figure 17 the shaft is preferably rotated in a clockwise direction and the leather strip is preferably wrapped partially around the shaft also in clockwise direction. The leather strip is held against the shaft to assist in the braking action by means of a spring clamping piece 66 suitably secured to the base by means of screws 67. As the shaft rotates in clockwise direction the friction between the leather strip and shaft tends to pull the leather with the shaft, but the strip being held resists the pull and exercises constant braking action, preferably greater than the tendency of other parts of the mechanism to cause the shaft to over-ride the motor. The leather being softer than the metal of the shaft does not cut or scratch the shaft as would rigid braking means.

This completes the description of the exterior parts, framework and driving mechanism of the instrument. The electrical circuits and then the interconnected mechanical parts will now be described.

The electrical circuits

As pointed out in the general discussion of the instrument, measuring the value of a condition such as a temperature condition involves balancing an electrical circuit against an electromotive force caused to vary according to the value of the condition, the amount of corrective effort necessary to balance the circuit being a measure of the value of the condition. It is this electrical measuring side of the instrument diagrammatically shown in Figure 15 that will now be described.

The circuit shown is generally known as a potentiometer circuit and comprises a "battery" circuit A comprising a battery having approximately 1.5 volts, a rheostat 206 connected by a lead 205 to the battery, and by a lead 207 through a series resistance 208 to the resistance or slide wire R, and back to the battery by leads 209 and 209a. By adjusting the rheostat 206 the potential drop across the slide wire R may be adjusted as will be described. The resistance 208 is placed in the circuit to reduce the potential at the high side of the slide wire. Shunted across the slide wire is a circuit comprising a lead 210, resistance 211, lead 212, resistance 213, and lead 209b. By thus shunting the slide wire the amount of resistance 208 necessary to reduce the potential drop across slide wire R is reduced. It is thus seen that the battery may be made to maintain a constant potential across the slide wire.

Meshed or connected with circuit A is "thermocouple" circuit B comprising one of the thermocouples T (as shown, the thermo-couple $T_1$) connected through the left side of switch 282 through lead 214 to contact rod 274. Thence the circuit goes through slide S to slide wire R through lead 209 to lead 209b through resistance 213 to lead 212 through lead 260a to the galvanometer, thence to lead 260, switch 216, lead 215, and back through the right side of switch 282 to the low side of the thermo-couple. By changing the position of switch 282 different thermo-couples $T_2$, $T_3$, $T_4$, $T_5$, and $T_6$ may be successively cut into and out of the circuit. In such a potentiometer circuit the thermo-couple maintains an electro-motive force at the slide proportionate to the temperature of the couple. By adjusting the position of the slide S along the slide wire R the electro-motive force set up by the thermo-couple may be balanced by an equal potential maintained by the battery, and when the two potentials are thus equalized no current flows through the galvanometer and the galvanometer needle is allowed to rest in its zero position as shown in the diagram. Moving the slide S to bring the potential of the thermo-couple into balance with a corresponding potential maintained by the battery will hereinafter be called balancing the circuits.

If a known potential drop is maintained across the slide wire R, then the gradient drop along the wire is known and from the position of the slide S when balancing the circuit the value of the temperature may be determined.

The switch 216 is normally in its left hand "run" position connecting the switch 282 and the galvanometer. To check the potential at the high side of the slide wire R, and so to check the drop across the slide wire R, a circuit C is provided comprising a lead 217 connecting a "standard cell" (known to have 1.0190 volts), with resistance 208, lead 210, resistance 211, galvanometer switch 216, lead 220, resistance 219 and back to the cell by lead 218. Also a shunt 221 around the galvanometer is provided to damp the galvanometer to prevent its vibrating.

To check the battery circuit the switch 216 is swung to its "check" position and if the potential maintained by the standard cell at the junction 222 equals the potential maintained at the junction by the battery, no current flows through the galvanometer. But if the potentials are different, current flows through and the galvanometer needle deflects. The potentials may be brought to equality by changing the rheostat 206. After the rheostat has been adjusted to equalize the potentials the switch 216 is set back to "run" position.

The operation of switch 282, which will be described hereinafter, is such that the switch bars in passing from one thermo-couple to another pass over "dead" posts 223 so that at no time will different thermo-couples be electrically connected with one another.

Thus circuit B may be balanced against the circuit A by shifting slide S along the rheostat R until the needle 241 assumes a neutral position at which time no current is flowing through the galvanometer and the circuits are balanced; the slide being moved step by step by the balancing mechanism under the command of the galvanometer needle. By turning the switch 282 the different thermo-couples may be successively cut in and out of the circuit so that the different temperatures may be successively measured.

*The galvanometer*

Since galvanometer needle 241 controls the balancing mechanism which in turn moves the slide to balance the potentiometer circuit and so measures the condition, and since this balancing operation may be made relatively delicate, the galvanometer needle itself is preferably sensitive. A galvanometer construction that has proven satisfactory is shown in some detail in Figures 4 and 5. It comprises the usual armature winding and frame 242 to which the needle is secured by means of nuts 243 suitably insulated from the armature frame by insulating washers 244. The needle and armature should be as light as possible so as to reduce their inertia. To this end the long forward working end of the needle is preferably formed from some strong but lightweight metal, the weight of which is adjustably balanced by a nut 245 threaded on the rearward end of the needle. For reasons that will be pointed out hereinafter the forward or working end of the needle is preferably flat on its bottom side and rounded on its top side.

The armature is preferably suspended by suitable fine torque wires 246 of a known type, which wires are secured to supporting springs 247 by soldering or other integral connecting media. These springs are adjustable by means of studded screws 248 to adjust the tension on the supporting wires 246.

The springs are held apart by an insulating frame formed from Bakelite or other suitable material 249 to which the lower spring is attached by means of a sleeve 250 rigidly mounted in the frame. To make the torque on the wires 246 adjustable to adjust the neutral position of the galvanometer needle the upper spring 247 is preferably rotatably mounted with respect to the stationary lower spring. To this end upper spring 247 is mounted on a sleeve 251 rotatably mounted in a well provided in the top of frame 249. The sleeve is held against vertical movement by a collar 252 mounted on the sleeve and keyed thereto by a set screw 253. The collar is held against vertical movement by the base of the opening in which it is mounted and by a spring 254 reacting against the top of the opening and against the collar thus holding the collar and sleeve against vertical movement.

Also secured to sleeve 251 is a gear 256 meshing with a worm gear 257 (see Figure 3, upper central portion) manually adjustable by a gnarled adjusting knob. The worm gear and knob are mounted between arms 258 extending upwardly from frame 249. By turning the worm gear 257 gear 256 is actuated together with sleeve 251 and the upper spring 247 to produce change in the torque in the suspending wires and the adjustment of the needle may be corrected.

Suitable leads such as 260 and 260a are taken from the springs 247 to connect the armature of the galvanometer with the potentiometer circuit. The galvanometer frame 249 is preferably mounted on the central section 35 of the carriage by means of screws 261 (shown in dotted lines at the right hand side of Figure 4) which extend upwardly from the section 35, these screws extending through corresponding holes provided in the frame 249 to form the male threads of a threaded engagement completed by female threaded members 262. This construction enables the galvanometer and its parts to be removed as a unit and to facilitate such removal the female members 262 are provided with extensions 263 by which members 262 may be manipulated. The upper ends of the extensions are provided with slots to receive the blade of a screw driver or other instrument for applying force at an advantage to tighten the members 262.

The usual magnet 264 associated with the galvanometer armature is suitably mounted on the top of carriage section 35, the magnet spanning the armature 242 when the galvanometer frame is secured in place.

The galvanometer needle should be so damped in its swinging and so proportioned with regard to its sensitivity as to be practically unaffected by vibrations or other influences not associated with the potentiometer circuit, otherwise the slide may be moved in response to conditions not associated with the condition being measured. Further, it should be damped so as to come to an approximate state of rest between each balancing operation as will be described.

It is of course understood that other galvanometer constructions may be used without departing from the scope of the invention.

The slide and rheostat

The slide S and rheostat or slide wire R which are employed under the command of galvanometer needle 241 to balance the potentiometer circuit and so to obtain a measurement of the temperature are shown in some detail in Figures 1, 3, 11 and 12. The rheostat or slide wire R comprises a resistance covered with suitable insulation wound on a suitable rod 265 mounted on either end in slit insulating blocks 266 which are secured by screws 267 to the top of carriage sides 32 and 33. The under side of the insulation of the resistance is removed as shown at 265a so that an electrical sliding contact may be made. The wire exposed by removing insulation is suitably polished so as to make the rheostat uniform throughout. Additional pieces of resistance 265b (referring to Figure 3) are mounted on the ends of the rod 265, these additional resistances being provided as a means for standardizing the rheostat units. As shown in the diagram of Figure 15 suitable leads connect the slide wire with the rest of the system.

Also as shown in the diagram in Figure 15 by electrically connecting rheostat R and rod 274 circuit B is completed and by varying the position of the connection the character or value of the circuit is adjusted. The slide S for accomplishing this adjustable connection should be preferably of such a construction as to be readily and easily slidable over the rod and rheostat with relatively little starting or sliding friction, and at the same time provide good electrical connection between the rheostat and rod. The slide S, as shown in Figures 11 and 12, has these desirable characteristics and comprises a sleeve 268 freely slidable on a polished shaft 269 parallel to the rheostat and rod 274 and mounted at its ends in the carriage sides 32 and 33. It is secured against lateral movement at one end only by suitable means such as a set screw (not shown). Secured to the sleeve is a metal supporting or carriage frame 270 extending forwardly and upwardly from the sleeve and on which is mounted by suitable nuts and screws an insulating block 271 supporting the sliding contacts 273 and 277 which electrically connect rod 274 and the resistance R. Contact 273 is mounted on a support 212 secured to base 271, the contact threadably engaging an upturned angle of the bar 272. This contact is designed to slide along and make a continuous contact with rod 274. The rearward end of the bar 272 is offset and carries a spring 275 attached thereto by a screw 276, the connection preferably providing a good electrical connection. At the forward end of spring 275 there is mounted on a downwardly turned angle the contact 277 (similar to contact 273) which slides on the underside of 265a of resistance R, the spring 275 supplying sufficient force to hold the contacts 273 and 277 against their respective slide members to give satisfactory electrical connection or contact therewith. A screw 278 serves to adjust the force of the spring so that the contacts do not bear so strongly against the rod 274 and resistance R as to interfere with the free sliding movement of the carriage. It is thus seen that the contact 273, bar 272, spring 275 and its corresponding contact 277 form an electrical connection between the rod 274 and the resistance R, and that the insulating block 271 prevents electrical connection between the rod 274 and resistance R and the other parts of the instrument.

Extending downwardly from the carriage support 270 is a prong 279 carrying a plate 280 carrying two screws 281 to which is preferably attached a belt, to be described, the belt forming a mechanical connection between the slide and the balancing mechanism.

As the slide S is moved back and forth across the instrument, more or less of the resistance R is cut into or out of the circuit B and the position of the slide, when the needle is balanced, is made indicative of the temperature being measured.

Balancing mechanism

As pointed out in the general discussion of the instrument a so-called balancing mechanism is used to translate deflection of the galvanometer needle into corrective adjustment of the slide to apply such corrective influence to the circuit as will move the galvanometer needle toward a zero position, and which corrective adjustment simultaneously moves the recording mechanism into a position more nearly in accordance with the value of the temperature being measured.

As mentioned in connection with the description of the galvanometer, the galvanometer needle is preferably sufficiently sensitive to move in response to slight unbalanced conditions, which small movements however may in some instances mean temperature changes in the order of more than one-half of one percent of the range of the instrument. For this reason the balancing mechanism should be capable of picking up such small movements and transferring them without loss to the slide mechanism to perfect more nearly the balancing of the circuits, and to position more nearly the recording mechanism in accordance with the value of the temperature being measured. To reduce in so far as possible errors which may enter into the measurements it is desirable to make the temperature scale relatively wide. Also as above pointed out it is desirable so to construct the balancing mechanism and slide mechanism that for any given deflection of the galvanometer needle (which is not a straight line function of the temperature) a correction is made in the potentiometer circuit sufficient to balance it. To this end lags and lost motion, such as are introduced by inertia and loose fitting parts, should be eliminated in order to have reasonably rapid operation of the parts. The balancing mechanism of the present invention is designed to have these desirable characteristics.

Referring to Figures 4 and 5, mounted on top of the middle carriage section 35 there is shown generally indicated at 70 a frame having a generally rectangular vertical front section 71, as shown in Figure 6, and upwardly extending front posts 72 and upwardly extending rear posts 73, the portion of the frame between these posts being cut away to avoid interference with the galvanometer. This frame mounts what might be termed the positioning means of the balancing mechanism, and the frame itself is readily mounted on or removed from the carriage. It is secured, when mounted, by screws 74 threaded into corresponding female threaded holes provided in the central carriage section 35. As shown in Figures 4 and 5 when the frame is in position with its parts mounted thereon, the needle of the galvanometer extends forwardly between the forward posts 72.

The position of the needle is detected by clamping it between, what might be termed for purposes of description, two blades of a scissors, the position of the needle between the blades determining the amount of spread of the blades. In the present instrument one of the levers or blades of this lever system which performs the scissor action, referring to Figure 5, periodically raises an anvil under the needle, raising it to a zero reference position from which reference position angular displacement of the other lever or blade of the scissor system is measured. The member thus periodically raising the needle comprises a rack bar 75 extending forwardly from the rear posts 73 of frame 70 where it is pivotally mounted on pins 76 adjustably held in the posts by set screws 77. The front 78 of the bar is preferably shaped so that when moved to its uppermost position, as shown in Figure 18, its face is very nearly in a vertical plane. It is noted that the bar is pivoted a considerable distance from its front portion so that the small arc through which the front moves may be considered a straight line.

Referring to Figure 4, the bar is raised and lowered by means of a lift spring member, generally indicated at 79, provided at its forward end with an adjusting screw 80 and lock nut 81, which forms a means for effecting an adjustment of the amount the spring is flexed at the top of its upward movement. The rearward end of the spring member is bent around a pin 82 which forms a pivotal support for the spring and which is mounted between upwardly extending sides 83 of a support 84 secured to the frame 70 by suitable means such as a screw 85 threaded into frame 70 through the forward end of the support which is bent downwardly into a vertical plane. By lifting or pushing up on the under side of the spring member 79 the rack bar is lifted to a high or zero reference position, as will be described, further upward movement of the spring lift only acting to flex it. The rack bar may be dropped by its own weight to its lower position. The upward motion of the rack bar is positively limited (and the reference position determined) by an angle piece 86 secured as by screws 87 (Figure 3) to the back side of the front 78 of rack bar; the angle piece coming into contact with a stop in the form of a threaded stud 88 adjustably threaded into a relatively heavy horizontal bar 89 supported as shown in Figure 16 by two posts 90 and 91. By adjusting the threaded stud 88 and locking it with a lock nut 92, a coarse adjustment of the upward limit of movement of the bar may be made. For reasons that will become evident a finer adjustment is desirable and to this end one end of the bar 89 is secured to its corresponding post 91 by a screw 93 having a differential thread. The end of the bar referred to is provided with a hole therethrough having a female thread with a relatively small pitch. The post 91 is provided with a hole having a female thread which has a slightly greater pitch. The screw 93 has a male threaded portion 93a for threading with the female thread in bar 89, and a male threaded portion 93b for threading with the female threads in post 91. Thus when screw 93 is threaded into the two female threads the resultant motion of the end of bar 89 with reference to the post 91 is the product of the turns times the difference between the pitches of the threads. This fine adjustment is further refined by putting the stud or stop 88 at some distance from the movable end of the bar 89. Thus by carefully adjusting screw 93 it is clear that a fine adjustment of the upper limit of movement of rack bar 75 may be accomplished.

As shown in Figures 3 and 4, on the front face 78 of rack bar 75 there is secured by suitable screws 96 an anvil 95. The anvil is preferably provided with flat upper or working surface 97 so positioned with respect to needle 241 that when the rack bar is in its lower position the needle is free to swing in a horizontal plane above the working surface; but when the rack bar is in its raised or zero reference position the working surface 97 of the anvil supports the free end of the needle always lifting it to the zero reference plane regardless of the amount of deflection.

The anvil surface forming a clamping surface of the scissor system is preferably made flat and horizontal so that in raising the needle to the reference plane vibration and force components which might cause the needle to move laterally over the anvil surface are reduced to a minimum. Also, as above described, by making the movement of the front 78 of bar 75 approximately straight line, no force components cause the rising anvil to push the needle back or pull it forward as the case might be, and unnecessary displacement of the needle is eliminated.

As will be pointed out, the rack bar is periodically raised and lowered by a cam contacting the under portion of spring 79 and needle 241 is periodically raised and freed. Extending upwardly from the front 78 of the rack bar 75 are two prongs 98, the prongs limiting the deflection of the needle from zero position to prevent the needle from swinging beyond the working range of the anvil and of the detector or feeler mechanism which will now be described and which constitutes the other arm of the so-called scissor lever system.

The detection of the needle deflection thus involves translating into some mechanical measurement the position of the needle with respect to the anvil which raises the needle to a zero reference plane from which its position may be measured.

The feelers or detector are generally indicated at 101 and are pivotally mounted on the forward posts 72 of frame 70 by means of pins mounted in the posts and held in place by set screws 100. Each feeler has an arm 102, the two arms extending toward each other and almost meeting over the zero or neutral position of the needle as shown in Figure 3. So as to prevent interference of the anvil and arms, the arms are preferably located in a plane slightly in front of the plane of the anvil. Each feeler also has a downwardly, centrally extending arm 103. The left and right downwardly extending arms (as viewed in Figure 3) contacting respectively (Figures 4 and 6) left and right rearwardly projecting pins 104 mounted in the upper portion of a lever 105 pivotally mounted in the vertical front portion 71 of frame 70. As shown in Figure 5, a helical spring 106 holds the depending arms 103 against pins 104. Arms 102 are provided with under surfaces 107 so shaped that when the needle is raised while in its zero or neutral position indicating a balanced condition of the circuit, as shown in Figure 3, it does not quite touch either of the arms 102 so that a small dead space is provided, as shown in Figure 18. This is accomplished by sloping the working surfaces of the arms so that space slightly more than sufficient to accommodate the needle is left between the top of the anvil and the ends of arms 102. But the arms are sloped so that as the needle moves out of the dead space ever so slightly (see Figure 19), the needle rising to its reference position touches the arm under which it is deflected before touching the other arm, causing the arm first touched to tilt or rise slightly and the arm not touched to lower, the working surfaces of the arms being so proportioned that the needle does not interfere with the dominant tilting of the arm not contacted. Further, the under surface 107 is also so shaped and positioned, with respect to the raised position of anvil surface 97, as to cause the arm 102, under which the needle is deflected, to be raised more in proportion as the needle takes positions of greater deflection, the mechanical advantage of the lever system preferably increasing as the deflection increases, and the sensitivity of the galvanometer decreases.

By providing the small dead space at the zero position of the needle, small deflections of the needle caused by influences other than electrical influences of the circuit are not transmitted to the slide or recording mechanism and the instrument is allowed to record a practically straight line if it is recording a temperature which is not varying.

By providing the top of the needle with the rounded surface (referring to Figure 19), the force of the anvil rising under the needle and positioning the arms 102 is transmitted through the needle to the arms without producing appreciable bending moments in the needle such as when released would cause deflection of the needle not produced by the galvanometer circuit itself.

From the foregoing it is seen that the arms 102 and 103 detect the position of the galvanometer needle, whether it be in its neutral position or in positions indicating states of unbalance. The character of the detection is transmitted to lever 105. This lever is preferably accurately mounted by means of a shaft 106 (Figure 4) secured to the lever by a suitable force fit. The shaft moves freely in a journal 108 mounted on frame 70 by screws 109. The shaft and journal are made relatively long to reduce play between the parts and are shown extending through the front sections of frame 70 and carriage section 35. On forced shaft 106 and located between the lever and a collar 107 integral with the journal 108 is a collar or washer 110 suitably "nitrided" to provide it with a hard wear-resisting surface, as are the shaft and journal 108. The lever and washer are held against the collar 107 by a light flat spring 111 pushing on the end of the shaft 106 which extends through lever 105 and slightly beyond its front surface. This spring is secured to a plate 112 by riveting or the like which is mounted on posts 113 (Figure 5) by means of screws 116. The light spring pressure on the lever holding it against the "nitrided" washer prevents axial movement of shaft 106 and introduces a required constant frictional drag on the lever which is sufficient to overcome momentum of the parts and also to prevent other forces from inadvertently shifting the lever.

Since it is desirable to make the whole positioning mechanism as light in weight as possible to reduce lags and other inaccuracies caused by inertia or momentum of the parts, lever 105 is preferably cut out in its central section as shown in Figure 6 to reduce its weight and the inertia.

With this arrangement measurements of the feelers transmitted to the upper end of lever 105 through pins 104 are transmitted without objectionable lost motion or frictional resistance to the lower end of lever 105 on which is pivotally mounted a link or floating lever, generally indicated at 117, forming with lever 105 a straight line motion lever system. The lever 117 is thus pivotally mounted by means of a threaded stud 118 having a relatively close but frictionless fit with a bushing 119 suitably forced or swaged through a hold in lever 117. The stud is threaded through lever 105 and a lock nut 120 is provided to prevent loosening of the stud. A free washer 121 takes up most of the axial play between the levers. The lever 117 is made as light as possible and may be formed of aluminum or other lightweight material. Mounted on the lower end of lever 117 is a pin 122, the pin and stud shaft 118 being separated by a distance equal to the distance separating shaft 106 and stud shaft 118. The pin moves in a slot 123 formed in a stationary downwardly extending lever 124 secured (Figure 6) to a cross-bar 125 mounted on posts (Figure 4) 126 secured to the vertical face 71 of frame 70 by suitable screws or the like. With this construction the upper free end of lever 117 (which is preferably separated from its fulcrum point by a distance equal to that separating shafts 106 and 118) moves in practically a straight horizontal line as lever 105 is pivoted by the detector arms, the lower end of lever 117 reciprocating in the vertical slot 123. This lever system is generally known as the "Scott Russell straight line motion" mechanism. The free end of the lever 117 carries a sheave or pulley 132 and is mechanically connected with the slide mechanism S as will be described.

To cause the upper end of lever 117 to move accurately in accordance with the detectors it is necessary to reduce lags and loose play in the mechanism without introducing objectionable friction. To provide an accurate machine fit without play or objectionable friction between pin 122 and slot 123 would require expensive operations, and to overcome the necessity for such work a special type of sliding contact is provided between the pin and slot in the present embodiment.

The guide provided is one which leaves the lower end of lever 117 entirely free and loose while the lever is being positioned by the delicate detector arms, but which provides an accurate contact free from play while the lever is being reset to its zero position by a powerful positive drive. This is accomplished by providing over the pin 122 a sleeve 127 having a reduced portion 128 adapted to reciprocate loosely in the slot 123, and an enlarged portion 129 having a spherical surface of larger diameter than the width of slot 123. The slot 123, as shown in cross section in Figure 6—A, has concave grooves in its sides spherically formed and into which the spherical contacting portion of the sleeve may be pressed to align accurately the parts.

As shown in the lower part of Figure 4, a screw 130 is provided to adjust the vertical position of the lower end of lever 124 to leave the spherical contacting portions just out of contact, except when the lever system is being reset.

By comparing the position of the parts, shown in Figures 3, 6, 18 and 20, it is clear that the magnitude of the deflection of the needle from zero position is multiplied and transmitted through the lever system to the free end of floating lever 117. The parts are made to move freely and have little mass so that they respond accurately to quick or rapid positioning impulses without over-shooting due to momentum.

Referring to Figures 4 and 21, on the free end of lever 117 is securely mounted, as by threaded engagement, a short shaft 131 carrying a lightweight pulley or sheave, generally indicated at 132, comprising generally a friction pulley 133 and a belt pulley 134. The friction pulley is supported on the shaft by ball bearings 135 running in a ball bearing race 136. On the circumference of the friction pulley mounted between and extending beyond flanges there is a ring providing a friction surface of some such material as rubber or the like. The belt pulley, while not mounted on ball bearings, is provided with a bushing which gives a reasonably frictionless support. This pulley is provided with flanges 137 which keep a belt in place as will be described. The belt pulley is driven by the friction pulley through a friction drive comprising, for example, a cork washer 138 mounted between the two pulleys with a spring 139 pressing the pulleys together, the spring being held in place by a lock nut 140. Relative rotational movement between the washer and belt pulley is prevented by a pin 138a extending therethrough. The whole assembly is prevented from slipping off shaft 131 by means of a screw and washer 141 threaded into the shaft.

Driving mechanism

To raise periodically the rack bar 75 to operate the detectors or feelers to detect the position of the needle, and position the positioning means in accordance with the detected position of the needle; and also to reset the lever system of the positioning means after it is positioned in accordance with the position of the needle there is provided a rocker cam member, generally indicated at 142, in the central portion of Figure 3. As shown in Figures 7 and 8, the cam is mounted on rocker arms 143 and 144 respectively, the rocker arms being mounted on shaft 145 and secured thereto by set screws 146 and 147. The cam member 142 is secured to the rocker arms by four screws 148, as shown in Figure 3. By making the rocker arms adjustable on the shaft 145 they may be brought into alignment with the ends of cam member 142, and also the whole mechanism formed by the cam 142 and the two rocker arms may be adjusted axially along the shaft. In the present embodiment the rocker cam 142 is shown as formed from Bakelite or like material, although it may be formed from steel or the like. The cam is preferably curvilinear in cross-section, as though it were cut from a cylinder concentric with the curved faces of the rocker arms 143 and 144, the axis of this imaginary cylinder being coincident with the axis of shaft 145.

With reference to Figure 8, rocker arm 143 is shown as provided with a cam follower 150 suitably mounted on a shaft 151, the cam follower being designed to ride on cam 49 previously described as mounted on the main drive shaft 42. For every complete revolution of the cam shaft 42 the rocker arm is twice oscillated, being raised to a high position determined by the crest of the cam and being lowered to a low position determined by the trough of the cam. Referring to Figure 7, to cause the cam follower 150 and rocker arm 143 to follow at all times the contour of cam 49 there is freely mounted on shaft 145 a V-lever 152 carrying on one of its arms a cam follower 153 mounted on a stub shaft 154 and riding on cam 46 previously described as being mounted on shaft 42. On the other arm of the V is a helical spring 155 stretching at its other end to rocker arm 144, to which it is attached by a screw stud 156. The relative positions of the cams 46 and 49 are shown in Figures 7 and 8, the two cams being so relatively positioned and proportioned as to maintain a substantially constant tension on the spring 155 at all times, and causing rocker arm 143 to follow cam 49.

The constant rotation of shaft 42 by motor 38 periodically raises and lowers cam member 142 twice for each revolution of the shaft.

The rocker cam 142 is provided on its central upper portion with a lug 157 having a lifting surface capable of engaging spring 79 resiliently to lift the rack 75 and anvil 95 to the zero reference position against stop 88. This is carried out, as shown in Figure 18, only as the cam rises to its uppermost position. To insure lifting the rack 75 until it abuts stop 88 the lift spring 79 is preferably adjusted so that it raises the rack 75 against the stop before cam 142 completes its upward movement, the remaining movement of the cam being absorbed by the flexing of the spring lift. This construction insures proper positioning of the rack 75 regardless of the wearing of cam parts and mechanical inaccuracies.

Thus as the rocker cam rises to its topmost position it supplies the power by which the detectors or feelers 101 position the pulley 132 of the positioning means in accordance with the position of the galvanometer needle.

The downward movement of cam 142 furnishes the power for resetting the pulley and positioning means to a zero position, this power being supplied by shaft 42 and controlled by cams 46 and 49 and by spring 155. Cam 142 accomplishes this resetting by means of an inverted V-notch cut into the cam, as shown in Figure 3, and having a cam surface 159. The V-notch is inverted over the pulley, and the cam surfaces 159 of the notch are preferably so proportioned as to form a surface on which the friction pulley may roll. This is made possible by so proportioning the cam 142 that the imaginary cylinder, from which the cam may be considered to be cut, contains the horizontal path in which the pulley may move. When the cam 142 is in its raised position and the vertex of the notch is raised appreciably above the pulley, the pulley is free to travel in its path across the lower extremities of the notch to assume its extreme positions under the influence of detectors 101 which are operated as the cam assumes its uppermost position, the pulley taking its extreme positions without interference of cam surface 159. Very shortly in the descent of the cam the needle is freed, and as the cam continues to descend cam surface 159 engages friction surface 133 of the pulley wherever it finds the pulley, forcing the pulley to roll along the cam surface until it reaches the vertex of the V-notch which determines the zero position of the pulley and associated positioning mechanism. The angle of the sides of the notch should be such as to cause the downward movement of the cam to create a pressure between the cam surface and pulley surface sufficient to insure a rolling and not a sliding contact between the pulley and cam surface for reasons that will be described hereinafter.

Although only a slight downward force on the pulley is needed to (Figure 4) cause a slight movement of the levers 105 and 117 laterally of the pivot point about which lever 105 pivots to seat the spherical contacting surfaces of the sleeve and slot to align the lower end of lever 117; the same pressure causing the rolling contact above described also seats the spherical contact guides.

The vertex of cam 142 determines the zero position of the positioning mechanism and detector arms, and means is provided to adjust the lateral position of the cam to bring its vertex into coincidence with the zero position of the positioning means. To this end means are provided in the mounting of shaft 145 (on which the rocker arms supporting cam 142 are mounted) for effecting a lateral adjustment of the shaft. Referring to Figures 5 and 9, shaft 145 is slidably mounted (but with a relatively close fit) in two sleeves 160, each sleeve being rotatably mounted on ball bearings (not shown) running in bushings suitably journaled in carriage section 35. Slidably mounted on the shaft 145 are three abutting sleeves 162, 163 and 164. These sleeves together span the distance between the sleeves 160 so that no axial or lateral play exists between the sleeves 162, 163 and 164 and the sleeves 160. Thus far it is clear that the shaft 145 is slidable through the various sleeves and to prevent such lateral movement sleeve 164 is provided with a collar 165 carrying a set screw 166 threadable through the collar and sleeve to engage or bite shaft 145, and so fix the shaft with respect to the various sleeves. The set screw 166, as shown in Figure 5, may be reached with a screw driver through a hole 167 in the frame 70 and carriage section 35 so that lateral adjustment of the shaft and cam 142 may be carried out to bring the parts into alignment after the mechanism has been assembled.

Reviewing briefly the balancing mechanism thus far described; for every half revolution of the drive shaft 42 cam 142 is once raised and lowered. During most of the rising motion it does not affect the positioning means but near the end of the rising motion it raises the spring lift and anvil under the needle lifting it wherever it may be to a zero reference position, the same motion moving the detector arms 101 into positions corresponding to the position of the needle. As the cam starts its descent the needle and detector arms are released almost immediately. Continued descent of the cam causes cam surface 159 to engage the friction roller 133, wherever it was left by the detector arms, and through a rolling contact moves the pulley and associated parts back to their zero position as determined by the vertex of the notch. Thus the distance through which the cam 142 has to return the pulley 132 in order to bring it to zero position is in effect a measure of the deflection of the needle.

This measurement is multiplied and transmitted to the slide S by means of a belt 168 of a strong material such as phosphorous bronze. The belt is passed once around the belt pulley 134 and the two ends of the belt (Figure 12) secured to the slide S by the previously mentioned terminal screws 281 mounted on the plate 280 extending downwardly from the carriage frame 270. Between the points of termination of the ends of the belt and the pulley 134 the belt passes over suitable sets of guide pulleys, each set comprising pulleys 169 and 170 (Figure 10) suitably mounted on the carriage sides by means of supports 171. The vertical position of the lower pulley of each set is adjustable to bring its under side tangent to a straight line tangent to the under sides of the belt pulley 134 and the other lower guide pulley, this alignment being desirable to prevent introduction of stresses on the positioning mechanism and belt as the pulley moves back and forth in its path. The adjustment is accomplished by mounting each of the lower pulleys on the lower prong formed by bifurcating an outwardly extending arm of the support 171 and providing each support with a set screw by which the position of the lower prong may be adjusted. When the friction pulley is free of cam surface 159, as when the pulley is being positioned by the detectors, the belt pulley is free to roll along the belt winding it on and off simultaneously with relatively no drag or tendency to move the belt. But when the friction pulley is held against the cam surface 159, as when the cam is returning the friction pulley to its zero position, the friction drive between the friction pulley and the belt pulley prevents such free rotation and causes the belt to move with the returning pulley and so to move the slides. The movement of the slide for any one return of the pulley to its neutral position is the algebraic sum of the distance the lever 105 must be moved to position it in its neutral position plus the distance the pulley rolls along the cam surface 159. Further, the rotation which the cam surface 159 imparts to the friction pulley is also imparted to the belt pulley which motion is transmitted to the belt and to the slide S. Thus the movement transmitted by the positioning means to the slide is the sum of that straight line motion necessary to return the pulley and associated parts to a zero position plus the effect of the rotational motion which the cam surface imparts to the friction pulley.

So, continuing the résumé, as the cam 142 descends after having positioned the positioning means according to the position of the needle it resets the positioning means and in doing so positively moves the slide into a position more nearly balancing the potentiometer circuit. The instrument is preferably constructed so that under normal conditions a satisfactory balancing of the potentiometer circuit is obtained by the balancing mechanism after three or four balancing operations, this being possible without rapidly moving the parts because of the multiplication of the detection in being transmitted to the slide mechanism. Another feature of the invention which makes this rapid balancing possible is the high degree of accuracy of the balancing mechanism and the fact that lags and lost motions are practically eliminated.

Referring again to the question of the weight of the parts of the positioning mechanism, they are made with as little mass as possible to cut down the effects of inertia and momentum. If the parts have a disadvantageous mass or weight, the positioning impulses imparted to the positioning mechanism by the rising anvil may be partially absorbed by the inertia of the parts. Further, with regard to the effect of momentum, if the parts are heavy the relatively rapid motion with which the rising anvil positions the positioning mechanism in accordance with the needle deflection gives the parts such momentum as to carry them beyond the position which they should assume in accordance with the needle deflection. Thus, if the parts are made heavy to overcome the effects of momentum the positioning motion should be made relatively slow thus cutting down the speed with which the instrument operates.

One of the advantages of the balancing mechanism as above described is that the effects of momentum and inertia are largely eliminated.

The period of oscillation of cam 142 is preferably so chosen with regard to the period of oscillation of the galvanometer needle that lapse of time between successive clampings of the needle by the anvil is greater than that required for the damping of the galvanometer to bring the needle to a state of approximate rest. Thus, the balancing mechanism does not move the slide in accordance with inaccurate positions of the needle.

When the value of a temperature is outside the range of the instrument the galvanometer needle assumes a deflected position against one of the limiting pins on the rack 75 because the circuit is unable to be balanced even when the slide S is moved into an extreme position. Under such circumstances continued operation of the balancing mechanism endeavors to move the slide S further than its extreme position. If provision were not made for releasing the power of the cam 142 under such circumstances a damaging of the parts would ensue. This releasing is effected however by the friction drive between the friction pulley 133 and the belt pulley 134. Under these conditions as the cam moves the friction pulley back to the vertex slippage occurs between the belt pulley and friction pulley allowing the belt pulley to wind and unwind along the belt.

The mechanism as thus far described has to do with taking the measurement of a temperature, the measurement being completed when the balancing mechanism moves slide mechanism S into a position balancing the potentiometer circuit, the position of the slide being an indication of the value of the temperature. The mechanism now to be described pertains to means for recording the measurement on a suitable chart such as shown through the window in Figure 1. The apparatus for mounting and driving the chart is similar to that shown in U. S. Patent No. 1,977,708, patented October 23, 1934, to Williams et al., and will be described only briefly here. A roll 173 of the chart paper (shown in dotted lines in Figure 1) is mounted between a support 174 (shown at the right side of Figure 3) and a support 175 (shown at the left side of Figure 3), the support 175 being slidably mounted on a screw stud 176 and normally held in its outermost position by a helical spring 177. To mount the chart roll on the supports the left end of the roll is placed against support 175 which is then pushed back over the screw stud 176 against the action of spring 177 to permit the right end of the roll to be fitted over the support 174, the spring 177 then returning support 175 into a position holding the roll between the two supports. The chart passes from the roll over a record feed roll, generally indicated at 178, extending crosswise of the machine. As described in the patent, the feed roll is provided with teeth 179 which mesh with holes 180 provided in the sides of the chart, the teeth positively driving the chart as roll 178 is driven by suitable means. Also as described in the patent, the feed roll is made adjustable in length to adjust the distance between the teeth at the opposite ends of the rolls to the width of the paper chart. Referring to Figure 10, the drive for the feed roll is shown. The roll is provided with a gear 181 meshing with a gear 182 mounted on a shaft 183 driven by a gear 184 (also mounted on the shaft) which in turn meshes with worm 45 previously described as being cut in shaft 42. The shaft 183 is suitably mounted in a frame 185 secured to the side carriage frame 33. With this construction the feed roll is constantly rotated by the shaft 42, the intermediate connecting gearing determining the speed of rotation. The desired speed is determined by taking into consideration the number of readings made per record per unit of time.

The paper passes from the feed roll to a winding roll 187 removably mounted between arms 186 (Figures 2 and 3) extending downwardly from the top front portion of the carriage sides, the mounting being accomplished in much the same manner as the chart roll is mounted, except that the right support is rotatable and is provided with a pulley 188 driven through a helical spring belt 189 which, in turn, is driven by a pulley 190 concentrically mounted with gear 181 and feed roll 178. The pulleys 190 and 188 and the winding roll are preferably so proportioned that the belt 189 tends to drive the winding roll at a greater surface speed than the surface speed of the feed roll 178, thus keeping taut the stretch of chart between feed roll 178 and winding roll 187. The spring belt keeps the desired tension without subjecting the chart to damaging stresses.

The mechanism for printing separate records of the temperatures, obtained at different places, on the constantly moving chart, in accordance with the measurements determined by the balancing mechanism, is shown in some detail in Figures 11, 12 and 13. Referring to Figures 11 and 12, there is shown mounted on a square rotatable shaft 191 a sleeve 192 freely slidable along the shaft but positively rotated thereby when the shaft rotates. While a square shaft is shown, it is understood that other types of shafts and sleeves may be used permitting of a sliding relation without relative rotational movement.

Secured on the sleeve is a type wheel, generally indicated at 193, provided with six type, or pieces of type, 194 preferably shaped to print dots but which may be shaped to print numerals or letters or the like. The shaft 191 normally holds the type wheel just above the chart passing over the feed roll periodically to drop the wheel onto the chart to cause one of the type 194 to contact with and print on the chart. Rotation of the shaft 191 and type wheel changes the type above the chart.

The type wheel is adjusted along the shaft and so adjusted laterally with respect to the chart by a connecting frame 195 mechanically connecting the slide S with the type wheel. Mounted on the rear of connecting frame 195 between upturned angles 198 and held against side play is a shaft 197. Shaft 197 is removably mechanically connected with slide S by a pivotal engagement between two arms 196 extending forwardly from the carriage frame 277 of the slide. The shaft has reduced end portions which enter corresponding holes formed in the ends of the arms 196, the shoulders on the shaft terminating in reduced portions forming stops against which the arms 196 springingly press. With this construction lateral movement of the carriage 270 of the slide S is transmitted without lost motion to the frame 195.

Referring to Figure 12A, frame 195 is cut out at 199 to receive the type wheel 193. Short lugs 350 extend inwardly from the frame and exert a slight spring pressure against the sides of the type wheel causing it to follow accurately lateral movements of the frame 195. With this construction it is seen that lateral movement of the slide is imparted without loss to the type wheel.

To hold frame 195 in place over the type wheel and prevent its being inadvertently raised therefrom the forward end 351 of one of the arms of the frame is hooked over sleeve 192.

The mechanism for inking each type with a characteristic color comprises a gear 352 secured to the type wheel 193. Meshing with this gear is a gear 353 (Figure 13) mounted on a shaft 354 mounted on an arm 355 extending upwardly from the frame 195. The shaft 354 is provided with a pin 356 extending therethrough and holding the gear 353 against axial movement. Rotation of the type wheel is transmitted by gear 353 to gear 352. Removably rotatably mounted on the shaft 354 and held in place by thumb nut 357 is a rack, generally indicated at 358, carrying felt inking pads 359 (a separate pad for each type on wheel 193). The rack comprises two parallel disks 360 rigidly mounted on a sleeve 361. The rack is rotated with gear 353 by a pin 362 extending from gear 353 and entering a hole in the disk 360 adjacent the gear.

As the type wheel and rack carrying the inking pads are rotated the type and pads contact with one another. Each type as it leaves its particular inking pad gives it a slight rotational movement with respect to the supporting disks so that when the pad and type are next brought into inking position the type contacts the pad at a place removed from where it contacted the pad in the next preceding inking operation. Each pad may be inked with a different color so that each type is also inked with a different color. Indications 360a adjacent disk 360 indicate the meaning of the colors.

The type wheel and rack 358 are preferably adjusted with respect to each other to synchronize the positions of the type and pads before the gears 352 and 353 are meshed.

The description of the mechanism for operating the printing mechanism will now be described. Referring to Figure 14, which shows a top plan view of the drive, square shaft 191 is shown as rotatably mounted on rocker arms 365 and 366 at the left and right sides respectively. The arms are rigidly secured to a sleeve 368 mounted over a drive shaft 369 extending beyond both sides of the carriage frame. Rocker arm 366 is extended beyond shaft 191 and doubled upon itself to the outside of carriage side 33, and the end of the arm is provided with a cam follower 367 riding on cam 2.

Adjustably secured to the left side of shaft 191 is a gear 370 meshing with a gear 371 suitably mounted on the shaft 369, rotation of the shaft 369 thus causing rotation of shaft 191 and the type wheel. On the right end of the shaft 369 outside the carriage frame is secured a star wheel 372 having six teeth 373. Referring to Figure 2, the star wheel 372 is driven in a step by step rotation (one sixth of a rotation per step) by the previously described cam 2 which carries a pin 377 (extending through an arcuate slot 378 in the cam) which pin trips the star wheel as cam 2 rotates. To prevent inadvertent jamming of the star wheel and pin 377 as might result as shown in Figure 22, pin 377 is mounted on a lever 375 (shown in dotted lines) pivotally mounted by means of a nut and bolt 376 on the inside of cam 2. A helical spring 379 secured at one end to the cam and at the other end to the lever normally holds pin 377 against the top of the slot as shown in Figure 2. However, if the star wheel gets out of synchronism with the cam so that, as shown in Figure 22, the end of one of the teeth 373 of the star wheel abuts against the pin, the spring 379 yields as the cam rotates to permit the tooth to push the pin back in the slot and thus such jamming of the star wheel and cam as might cause breakage is avoided.

Thus with each revolution of the cam 2 a different type is presented above the record chart. Adjustment of the gear 370 on shaft 191 permits the type to be positioned accurately in printing position.

To cause the type wheel to print at the proper moment the cam 2 is provided with a notch 380 into which the cam follower 367 mounted on the rocker arm 366 rolls dropping shaft 191 and causing the printing or type wheel to contact the chart. Immediately thereafter the notch of the cam raises the cam follower lifting the type wheel out of contact with the chart. It is noted that cam 2 is preferably driven in a clockwise manner and that the pin rotating the star wheel is positioned ahead of the notch 380 so that the star wheel rotates the type wheel, to change the type, just before the rocker arm 366 initiates the printing operation.

The cam 2 may be driven as shown from the main shaft 42 by gear 44 mounted on the end of shaft 42 and driving through an idling gear 382 a gear 383 concentrically mounted with the cam 2.

Inasmuch as the balancing mechanism is preferably constructed to balance the potentiometer circuit to complete a temperature measurement, in nine balancing operations, the gearing driving the printing mechanism is preferably proportioned to cause the printing mechanism to print after every nine balancing operations, and the printing mechanism and balancing mechanism are preferably so synchronized that the printing operation is carried out while the galvanometer needle and positioning mechanism are free of the cam 142.

The switch, diagrammatically shown in Figure 15 for successively cutting the different thermo-couples into and out of the potentiometer circuit, is generally shown in Figure 14 at 282 and is shifted simultaneously with the rotation of the type wheel. This is accomplished by rotatably mounting the switch bar 283 on a shaft 284 which extends through the carriage side and to which is secured a sprocket 285. The sprocket 285 is driven through a chain 287 by a similar sprocket 286 mounted on shaft 369 driven by the star wheel 372.

The printing mechanism disclosed in this specification is being covered in a co-pending application Serial No. 158,301, filed August 10, 1937.

As various embodiments might be made of this invention, and as various changes might be made in the construction herein described, all without departing from the scope of the invention, it is to be understood that all matter herein set forth or shown in the accompanying drawings is to be interpreted as illustrative and not in a limiting sense.

I claim:

1. Apparatus for moving a movable member in accordance with the magnitude and direction of a deflectable member comprising in combination a floating lever forming part of a straight line motion mechanism, a pulley mounted on a free end of said lever, a belt passing around said pulley and operatively connected to said movable member, said lever and pulley normally having free relative movement with respect to said belt, detecting means for detecting the position of said deflectable member and cooperating in positioning said lever and pulley according to the position of said deflectable member, means for moving said lever and pulley from said position to a neutral position and simultaneously restricting the normally free relative movement between said belt and said lever and pulley, said last-named means including a bar having a V-notch within the confines of which said pulley operates, and drive means for reciprocating said bar to move the notch out of contact with said pulley to permit said lever and pulley to be positioned freely and to move said bar to engage said pulley and to cause it to roll to the said neutral position at the vertex of said notch.

2. Apparatus for positioning a movable member in accordance with the position of a deflectable member comprising in combination a floating lever forming part of a straight line motion mechanism, a pulley mounted on a free end of said lever, a belt passing around said pulley and operatively connected to said movable member, said lever and pulley normally having free relative movement with respect to said belt, detecting means for detecting the position of said deflectable member and for moving said lever and pulley to a position corresponding to the position of said deflectable member, means for moving said lever and pulley from said position to a neutral position and simultaneously restricting the normally free relative movement between said belt and said lever and pulley, said last-named means comprising a bar having a V-notch within the boundaries of which said pulley operates, and drive means for reciprocating said bar to move the notch out of contact with said pulley to permit said lever and pulley to be positioned freely by said detector means and to move said bar to engage said pulley to cause it to roll to said neutral position at the vertex of said notch.

3. Apparatus for positioning a movable member in accordance with the position of a deflectable member comprising in combination a pivoted lever, a floating lever pivotally mounted at its mid portion on said pivoted lever, a pulley mounted on one end of said floating lever, the other end thereof slidably engaging a stationary lever, a belt passing around said pulley and connected at its ends to said movable member, said lever and pulley normally having free relative movement with respect to said belt, means for positioning said lever and pulley in accordance with the magnitude and direction of the deflection of the deflectable member, means for moving said lever and pulley from said last position to a neutral position and simultaneously restricting the normally free relative movement between said belt and said lever and pulley to cause the pulley to drive the belt and movable member.

4. Apparatus for positioning a movable member in accordance with the position of a deflectable member comprising in combination a lever forming part of a straight line motion mechanism, a pulley mounted on a free end of said lever, a belt passing around said pulley and operatively connected to said movable member, said pulley normally being free to roll along said belt, means for moving said lever and pulley to a position corresponding to the position of said deflectable member, and means for engaging said pulley in a rolling contact and moving said lever and pulley from said position to a neutral position to cause the pulley to drive said belt to move the movable member.

5. Apparatus for positioning a movable member in accordance with the position of a deflectable member comprising in combination a lever forming part of a straight line motion mechanism, a pulley mounted on a free end of said lever, a belt passing around said pulley and operatively connected to said movable member, said lever and pulley normally having free relative movement with respect to said belt, means for moving said lever and pulley to a position corresponding to the position of said deflectable member, means for moving said lever and pulley from said position to a neutral position and simultaneously restricting the normally free relative movement between said belt, said lever and pulley to move said movable member with said lever through the medium of said belt.

6. Apparatus for positioning a movable member in accordance with the position of a deflectable member comprising, in combination, movable means, a belt operatively connecting said movable member and said movable means, said movable means normally being freely movable with respect to said belt, means for moving said movable means to a position corresponding to the position of said deflectable member, and means for moving said movable means from said position to a neutral position and simultaneously restricting the normal free relative movement between said belt and movable means to positively move the movable member through the medium of said belt.

7. Apparatus for positioning a movable member in accordance with the position of a deflectable member comprising in combination a floating lever forming part of a straight line motion mechanism, a pulley mounted on a free end of said lever, a belt passing around said pulley and connected at its ends to said movable member, said lever and pulley normally having free relative movement with respect to said belt, means for moving said lever and pulley to a position corresponding to the position of said deflectable member, means for moving said lever and pulley from said position to a neutral position and simultaneously restricting the normally free relative movement between said belt and said lever and pulley, said last-named means comprising a bar having a V-notch within the boundaries of which said pulley operates, and drive means for reciprocating said bar to move the notch out of contact with said pulley to permit said lever and pulley to be positioned freely by said detector means and to move said bar to engage said pulley to cause it to roll to said neutral position at the vertex of said notch, and said pulley comprising a section having a frictional surface for contact with said bar and a section for receiving said belt and a frictional drive between said sections.

8. In apparatus of the class described, in combination, a deflectable element, movable means, selector means freely positionable in accordance with the magnitude and direction of the deflection of the deflectable element, belt means operatively connected with said selector and movable means and normally permitting free relative movement between said selector and movable means, and means for moving said selector to a neutral position subsequent to its being positioned in accordance with the position of the deflectable element and for simultaneously restricting the free relative movement between the selector and movable means to positively move said movable means with the selector through the medium of said belt.

9. Position translating mechanism for moving movable means in accordance with the deflection of a deflectable element, comprising in combination selector means, straight line motion mechanism having a wheel mounted thereon and movable in a substantially straight line in accordance with the magnitude and direction of the deflection of said deflectable element, means operatively connecting said wheel and movable means though normally permitting free movement therebetween, means for engaging said wheel in a rolling contact for moving said wheel to a neutral position subsequent to its being positioned in accordance with the position of said deflectable element and simultaneously causing said connecting means to be driven by said wheel to move said movable means.

10. In apparatus for measuring the value of a condition including an electrical system of the class wherein an electrical circuit is unbalanced by changes in the value of the condition and is rebalanced by adjustable electrical means, and which includes a responsive element movable from a neutral position by the unbalanced condition of the circuit, the combination of, movable means operatively connected with said adjustable means, a movable member, a belt connecting said movable member and said movable means, said movable member normally being freely movable with respect to said belt, means for moving said movable member to a position corresponding in magnitude and direction to the deflection of said responsive element, and means for moving said movable member from said position to a neutral position and simultaneously restricting the normally free relative movement between said belt and movable member.

FRANK MOORE.